United States Patent [19]

Voorhorst

[11] Patent Number: 4,759,416

[45] Date of Patent: Jul. 26, 1988

[54] WEIGHING ELEMENT FOR A WEIGHING APPARATUS

[75] Inventor: Fokke R. Voorhorst, Drachten, Netherlands

[73] Assignee: U.S. Philips Corporation, New York, N.Y.

[21] Appl. No.: 901,353

[22] Filed: Aug. 28, 1986

[30] Foreign Application Priority Data

Sep. 3, 1985 [NL] Netherlands .................. 8502403

[51] Int. Cl.$^4$ .................. G01G 3/14; G01G 3/08; G01L 1/22
[52] U.S. Cl. .................. 177/211; 177/229; 177/DIG. 9; 73/862.65
[58] Field of Search .................. 177/126, 211, DIG. 9, 177/229; 73/862.65

[56] References Cited

U.S. PATENT DOCUMENTS

| | | | |
|---|---|---|---|
| 4,453,609 | 6/1984 | Griffen et al. .................. | 73/862.65 X |
| 4,456,085 | 6/1984 | Boyles .................. | 177/DIG. 9 |
| 4,577,709 | 3/1986 | Shibahara et al. .................. | 177/211 |
| 4,712,628 | 12/1987 | Van den Brug .................. | 177/229 |

FOREIGN PATENT DOCUMENTS 2009940 6/1979 United Kingdom .................. 177/211

Primary Examiner—George H. Miller, Jr.
Attorney, Agent, or Firm—Robert T. Mayer

[57] ABSTRACT

The invention relates to a weighing element for a weighing apparatus, comprising an elongated plate-shaped ceramic bending element (1) provided with strain-gauge transducers, one end (2) of the bending element being secured to a frame (6) of the weighing element, the free other end being secured to a torque lead-in arm (10), said bending element being supported by the frame and by the arm at a distance a from said one end and said other end, respectively. In order to increase the accuracy of the weighing element it is proposed to make the frame and arm supports (8, 13) resilient in the longitudinal direction of the bending element.

2 Claims, 1 Drawing Sheet

WEIGHING ELEMENT FOR A WEIGHING APPARATUS

The invention relates to a weighing element for a weighing apparatus, comprising an elongated plate-shaped ceramic bending element provided with strain-gauge transducers, one end of the bending element being secured to a frame of the weighing element, the free other end being secured to a torque lead-in arm, said bending element being supported by the frame and by the arm at a distance from said one end and said other end, respectively.

A weighing element of this kind is known from European application No. 0 161 708. The supports for the bending element by the frame and arm, respectively, are rigid here, in the sense that they are immobile in relation to the bending element. If the weighing apparatus is loaded, and, as a consequence thereof, the bending element starts to bend; the contact points of the bending element with the supports will be displaced slightly in a horizontal direction (longitudinal direction of the bending element), so that friction between these contact points and the supports will occur. This causes hysteresis and hence weighing inaccuracy.

The object of the invention is to reduce the said hysteresis effect in the weighing element of the type defined in the opening paragraph.

According to the invention the weighing element is characterized in that the frame and arm supports are resilient in the longitudinal direction of the bending element. Consequently, during the deflection of the bending element, the supports will move together with the associated contact points of the bending element, so that no friction or scarcely any will occur and hence no hysteresis will occur. The distance between the fastening points of the ends of the bending element and the respective supports remain practically the same. The weighing accuracy will be improved thereby.

By rounding off the support surfaces of each of the supports, further (second-order) displacements of the support in relation to the fastening points of the bending element will also be suppressed. The rounding-off will preferably be barrel-shaped.

An embodiment of the invention will now be described in more detail, by way of example, with reference to the drawings.

Figure 1:
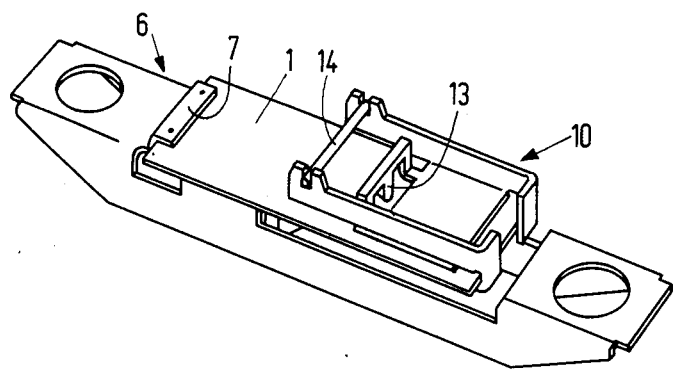
FIG. 1 is a perspective top view of the weighing element.
Figure 2:
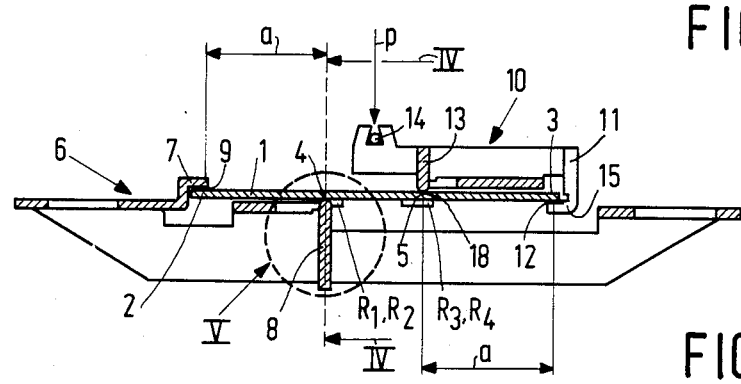
FIG. 2 is a longitudinal-sectional view of the weighing element in FIG. 1.
Figure 3:
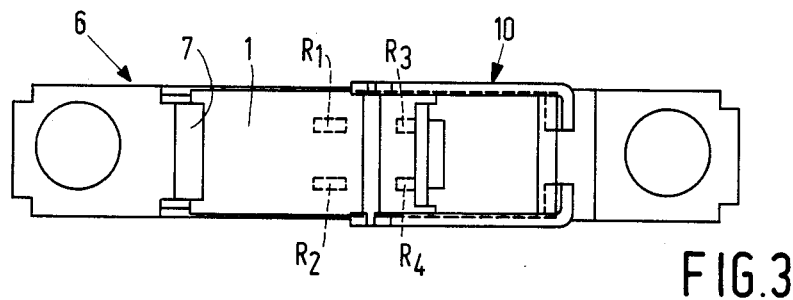
FIG. 3 is a plan view of the weighing element shown in FIG. 2.

The weighing element comprises a bending element 1 in the form of a small elongated rectangular ceramic plate, on one side of which four strain-gauge transducers comprising film resistors $R_1$, $R_2$, $R_3$ and $R_4$ are arranged. In known manner the resistors are arranged as a Wheatstone bridge in order to determine the resistance variation caused by the deformation of the bending element and hence, the value of the bending force.

At one end 2 the bending element 1 is secured to a projecting tongue 7 of an U-shaped frame 6 by means of a curable adhesive 9 and at contact point 4 spaced a distance a from its end 2 the bending element is supported by a part 8 bent from the frame of the weighing element.

In order to have a bending force applied to the bending element subject the element to bending moments which will produce both negative and positive strain at one side of the bending element, the bending force P, is applied in such a way that a torque is produced in a portion of the bending element at the free other end 3 of the bending element. For this purpose the weighing element is provided with an arm 10. One end 11 of the arm is secured to the free end 3 of the bending element by means of a curable adhesive 12. At a distance equal to the distance a from this free end 3, the bending element is contacted at contact point 5 by a portion 13 of the arm. The arm 10 extends to substantially halfway along the bending element, where force P acts on a pin 14 secured to the free end of the arm. In order to obtain a torque, the end 11 of the arm is constructed as a hook 15 which engages the lower side of the bending element, so that reaction forces of hook 15 and the support 13 act at opposite sides of the bending element. The bending element is secured to the frame and the arm mainly to support the bending element. Therefore the layers of adhesives 9 and 12 may be very thin. In fact the adhesive merely serve to prevent lateral displacements of the bending element relative to the frame and the arm, respectively. This minimizes possible adverse effects of the adhesive bonds on the accuracy.

Figure 4:
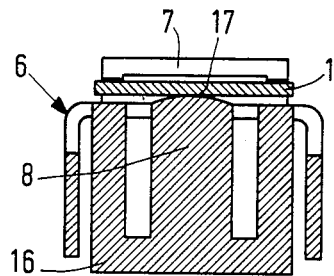
FIG. 4 is a cross-sectional view of the weighing element along the line IV—IV in FIG. 2, on an enlarged scale.
Figure 5:
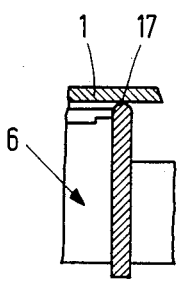
FIG. 5 is a detail of the cross-sectional view of a support of the weighing element indicated by the circle V, in FIG. 2, on an enlarged scale.

In order to keep the friction between the supports 8 and 13 on the one hand and the ceramic bending element on the other as small as possible during the bending of the bending element as a result of the bending force P, these supports according to the invention, are made resilient to a certain extent in the longitudinal direction of the element. In the other directions the supports are rigid. Support 8 is shown in detail and on a larger scale in FIGS. 4 and 5. Support 8 is formed by stamping a part 16 from the frame 6 and bending this part 16 at right angles, the lip formed during the stamping operation forming the actual support. This support is thus resilient only in the longitudinal direction of the element. The support 13 is formed in the same manner from arm 10. This support is visible in perspective in FIG. 1.

A further improvement of the weighing accuracy can be obtained by rounding off the support surfaces 17 and 18 of the supports. Theoretically a point-contact support would be best. In practice, however, that is not feasible. Moreover, a point-contact support would quickly lead to fracturing of the ceramic element. During the bending of the bending element 1 and its attendant local displacements in longitudinal direction, the supports, because of their resilient set-up, move together with those displacements and tilt to some extent at the same time. Therefore it is an advantage to round off the support surfaces 17 and 18 of each of the supports, in any case for the purpose of this tilting, with a small radius, e.g. 2 mm (see FIG. 5). Each support surface 17 is also rounded off in a direction perpendicular to it, e.g. with the radius of 10 mm (see FIG. 4), so that a kind of barrel-shaped rounding-off is obtained.

What is claimed is:

1. A weighing element for a weighing apparatus comprising a frame; a bending element having one end and a top and bottom surface and strain-gauge transducers mounted thereon; said bending element having its top surface secured to said frame at said one end; said bending element having a free end; a force-transmitting arm with a first end secured to the bottom surface of said free end of said bending element; support means for said bending element and said force-transmitting arm; said support means for said bending element contacting said bottom surface of said bending element; said support means for said force-transmitting arm contacting the top surface of said bending element; pin means on said force-transmitting arm through which forces are applied thereto to cause said bending element to bend; said support means having resiliency and bending when said bending element is being bent by an applied force.

2. A weighing element as claimed in claim 1, wherein the support surface of each of the supports is rounded off.

* * * * *